United States Patent Office 2,959,576
Patented Nov. 8, 1960

2,959,576

PROCESS AND CATALYST FOR PRODUCTION OF OLEFIN POLYMERS

Jimmie S. Payne, Austin, Tex., assignor to Phillips Petroleum Company, a corporation of Delaware No Drawing. Filed Nov. 14, 1955, Ser. No. 546,786

14 Claims. (Cl. 260—94.9)

This invention relates to the polymerization of olefins. In one aspect, this invention relates to an improved method for polymerizing olefins and to a novel catalyst therefor.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. However, it is often desired to produce higher molecular weight polymers which have desirable properties of heat stability and can be molded into vessels, pipes and tubing. Such uses cannot be made of the lower molecular weight polymers, for example, a polymer having a molecular weight of about 1000, since a polymer of this molecular weight is a wax-like material.

An object of this invention, therefore, is to provide an improved process for the production of olefin polymers.

A further object is to provide a novel catalyst for use in the production of olefin polymers.

A still further object is to produce high molecular weight solid polymers of olefins, such as ethylene.

Other and further objects and advantages of the invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising (A) an organo derivative of a metal of group IV-A of the periodic table (Mendeleeff's Periodic System), (B) a hydride or organo compound of a metal of groups II to VIII, inclusive, of the periodic table (Mendeleeff's Periodic System), and (C) a member selected from the group consisting of halogens and hydrogen halides. The improvement obtained by utilizing the novel catalysts of the invention is, firstly, that polymers of much higher molecular weight can be obtained than is true when certain of the prior art catalysts are employed and, secondly, the polymerization reaction, particularly for ethylene, can be initiated and carried out at considerably lower temperatures and pressures than are necessary when using the catalysts and processes of the prior art.

The group IV-A metal derivative component of my catalyst system comprises at least one compound selected from the group consisting of (1) salts of monobasic organic acids and a group IV-A metal, (2) complex salts of dibasic organic acids and at least one group IV-A metal and at least one member selected from the group consisting of alkali metals and ammonia, (3) complex compounds of a group IV-A metal corresponding to the formula $X_nM(OR)_m$, (4) complex compounds of a group IV-A metal corresponding to the formula $$M_a[(OCH_2CH_2)_aNH_{(3-a)}]_b$$

and (5) acetylacetonates of a group IV-A metal, wherein X is a halogen, wherein M is a metal selected from the group consisting of titanium, zirconium, hafnium, and thorium, wherein R is selected from the group consisting of R″ and R‴, where R″ is selected from the group consisting of saturated acyclic (alkyl), monoolefinic acyclic (alkenyl), saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, arylalkenyl, cycloalkylalkenyl, cycloalkylalkyl, alkenylaryl, and alkenylcycloalkyl. R‴ is selected from the group consisting of (a) R″ radicals which are halogen substituted, (b) R″ radicals which contain oxygen, and (c) R″ radicals which are halogen substituted and contain oxygen, said oxygen being present in the form of an ether linkage, wherein $m$ and $n$ are whole numbers, with $m$ being at least 1 and not greater than the valence of the metal and with the sum of $m$ and $n$ being equal to the valence of M, and wherein $a$ is an integer from 1 to 3, inclusive, and $b$ is equal to the valence of M. Each R contains not more than 20 carbon atoms, preferably less than 10 carbon atoms, with the total number of carbon atoms in the complex compound not exceeding 50. The expression "group IV-A metal" as used herein is intended to include titanium, zirconium, hafnium, and thorium. X and the halogen contained in the R radical can be any of the halogens, including bromine, chlorine, fluorine, and iodine. Mixtures of any two or more of these derivatives can be used in the practice of my invention. Salts of monobasic organic acids and a group IV-A metal which can be used include such compounds as titanium acetate, zirconium propionate, titanium butyrate, and the like. Complex salts of dibasic organic acids and at least one group IV-A metal and at least one of the group consisting of alkali metals and ammonia can also be advantageously employed in my catalyst system. Examples of such compounds are sodium titanium malonate $$(Na_2TiO(C_3H_2O_4)_2)$$

potassium titanium oxalate (the complex salt of oxalic acid and titanium and potassium $(K_2TiO(C_2O_4)_2)$, and the like. Of the latter group of compounds potassium titanium oxalate is the compound which is preferred for use in the catalyst system of my invention. Although numerous derivatives fall within the scope of the class of complex compounds corresponding to the formula $X_nM(OR)_m$, the preferred derivatives include titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl)titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichloro diethyl titanate ($Cl_2Ti(OC_2H_5)_2$), monochloro triethyl titanate ($ClTi(OC_2H_5)_3$), and dichloro diethyl zirconate ($Cl_2Zr(OC_2H_5)_2$). Also included are such compounds as $Hf(OCH_3)_4$, $Th(OC_3H_7)_4$, $Th(OC_6H_5)_4$, $$Cl_3Ti(OC_6H_4CH_3)$$

$Zr(OC_4H_7)_4$, $Cl_2Hf(OC_{10}H_{21})_2$, $Th(OC_6H_{13})_4$, and $Zr(OC_{12}H_{25})_4$. Of the complex compounds listed in the above group, titanium butoxide ($Ti(OC_4H_9)_4$) is preferred for use in my catalyst system since the use of this material as a catalyst in the polymerization of ethylene provides a high molecular weight polymer which can be molded into a variety of shapes and forms. Examples of complex compounds corresponding to the formula $$M_a[(OCH_2CH_2)_aNH_{(3-a)}]_b$$

which can be employed in my catalyst system include monoethanolamine titanate, diethanolamine titanate, triethanolamine titanate, monoethanolamine zirconate, diethanolamine zirconate, triethanolamine zirconate, monoethanolamine thoriate, and the like. Of this latter group of compounds, it is preferred to use triethanolamine titanate in the catalyst system of my invention. Examples of the acetylacetonates are titanium acetylacetonate, zirconium acetylacetonate and thorium acetylacetonate. The group IV–A metal derivatives listed hereinabove are preferably employed in the anhydrous or substantially anhydrous form.

In combination with one or more of the group IV–A metal derivative components described above, the catalyst system of my invention comprises a hydride or organo compound of the metals of groups II to VIII, inclusive, of the periodic table. It is preferred to employ a hydride or organo compound of metals of groups II–B and III–B, including beryllium, magnesium, zinc, cadmium, mercury, aluminum, gallium, indium, and thallium. The general formula for such compounds is $M'R'_x$, where $M'$ is one of the foregoing metals, $R'$ is hydrogen, a monovalent saturated alkyl hydrocarbon radical, a monovalent saturated cycloalkyl hydrocarbon radical, a monovalent aromatic hydrocarbon radical or any combination thereof, and $x$ is equal to the valence of the metal $M'$ and is at least 2. Examples of compounds corresponding to the formula $M'R'_x$ which can be used are $Al(C_2H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$, $Al(C_6H_{13})_3$, $Al(CH_2-(CH_2)_{18}-CH_3)_3$, $Ga(C_6H_5)_3$, $In(C_6H_5)_3$, $(C_2H_5)_2Zn$, $(C_4H_9)_2Hg$, and the like. These compounds can also be used in the form of their known and stable organic complexes, such as complexes with ethers, thioethers, amines, alkali metal hydrides, alkali metal alkyls, or alkali metal aryls. Examples of such complex compounds which can be used in my catalyst system are $LiAlH_4$, $NaAl(CH_3)_4$, $NaBe(C_6H_5)_3$, $NaBe(C_2H_5)_3$ and the like.

The third component of my catalyst system is selected from the group consisting of halogens and hydrogen halides. Included in this group of materials are bromine, chlorine, iodine, fluorine, iodine bromide, iodine chloride, iodine fluoride, chlorine fluoride, bromine fluoride, bromine chloride, hydrogen bromide, hydrogen chloride, hydrogen iodide, and hydrogen fluoride.

The components of my catalyst system as described hereinabove are usually used in the anhydrous or substantially anhydrous state. It is to be understood that mixtures of two or more members of each of the above-described three classes of materials can be used in the practice of my invention.

Among catalyst compositions falling within the scope of this disclosure which are preferred because their use to catalyze the polymerization of olefins provides relatively high molecular weight polymers and/or permits the use of relatively low reaction temperatures and pressures are the following: triethylaluminum, titanium butoxide and bromine; triethylaluminum, titanium acetylacetonate and chlorine; triethylgallium, zirconium butoxide and chlorine; triethylaluminum, titanium butoxide and hydrogen chloride (anhydrous); and diethylberyllium, titanium potassium oxalate and hydrogen bromide (anhydrous).

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amounts of halogen or hydrogen halide to $M'R'_x$ compound will usually be in the range of 0.01 to 5, preferably 0.01 to 2 and more desirably 0.5 to 1, mols of halogen or hydrogen halide per mol of $M'R'_x$ compound. The ratio of group IV–A metal derivative to $M'R'_x$ compound will usually be in the range of 0.01 to 5, preferably 0.01 to 1 and more desirably 0.1 to 0.5, mols of group IV–A metal derivative per mol of $M'R'_x$ compound.

The materials which are polymerized in accordance with this invention can be defined broadly as polymerizable hydrocarbons. Preferably, the polymerizable hydrocarbons are olefins containing a $CH_2=C<$ radical. The preferred class of polymerizable hydrocarbons used is 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylene can also be used. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of my novel catalyst as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention. This invention is also applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene and the like. It is also within the scope of the invention to polymerize such conjugated dienes either alone or in admixture with each other and/or with one or more other compounds containing an active $CH_2=C<$ group which are copolymerizable therewith. Examples of such monoolefins are listed above. Examples of other compounds containing the active $CH_2=C<$ group include styrene, acrylonitrile, methyl acrylate, methyl methacrylate, vinyl chloride, 2-methyl-5-vinylpyridine, 2-vinylpyridine, etc.

One of the important advantages obtained in the polymerization of olefins in the presence of my novel catalyst is that lower temperatures and pressures can be used than in certain of the prior art processes. The temperature at which polymerization of olefins in the presence of these catalysts can be carried out can be varied over a rather broad range, such as from zero to 500° F. The preferred range is from 100 to 350° F. Although pressures ranging from atmospheric up to 30,000 p.s.i.g. or higher can be employed, a pressure in the range of 100 to 1,000 p.s.i.g. is usually preferred.

In this connection, it is noted that it is preferred to carry out the reaction in the presence of an inert, organic diluent, preferably a hydrocarbon, with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, cycloparaffins and/or aromatic hydrocarbons which are relatively inert, non-deleterious and liquid under the conditions of the process. The lower molecular weight alkanes, such as propane, butane, and pentane, are especially useful when the process is carried out at low temperatures. However, the higher molecular weight paraffins and cycloparaffins, such as isooctane, cyclohexane, methylcyclohexane, and aromatic diluents, such as benzene, toluene, and the like, can also be used, particularly when operating at higher temperatures. Halogenated hydrocarbons, such as halogenated aromatics, halogenated paraffins, halogenated cycloparaffins, etc., are also useful as diluents. Mixtures of any two or more of the above-named diluents can also be employed in the process of this invention.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends upon the temperature at which the process is carried out to a great extent. The residence time also varies with the specific olefin that is polymerized. However, the residence time for the polymerization of aliphatic monoolefins, within the preferred temperature range of 100 to 350° F., falls within the range of one second to an hour or more. In the batch process, the time for the reaction can vary widely, also, such as up to 24 hours or more.

It has been found that various materials have a tendency to inactivate the catalyst compositions of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable, also, that air and moisture be removed from the reaction vessel before the reaction is carried out; however, small amounts of water can be tolerated in the reaction while still obtaining reasonably good polymerization rates.

At the completion of the polymerization reaction, when a batch process is used, the reactor is cooled to about room temperature, any excess olefin is vented and the contents of the reactor, including the solid polymer swollen with diluent, is then treated to inactivate the catalyst, as by washing with an alcohol. The alcohol-washing step is preferably carried out in a comminution zone, such as a Waring Blendor, so that a finely-divided polymer is thereby provided. The polymer is then separated from the alcohol and diluent by decantation or filtration and then the polymer is dried. When the process of the invention is carried out continuously, the total effluent from the reactor, including polymer, diluent and catalyst system is pumped from the reactor as a slurry to a catalyst-inactivating zone the reactor effluent is cooled and contacted with a suitable catalyst-inactivating material, such as an alcohol, to precipitate the polymer. As in the batch process, it is desirable that the alcohol-treatment step be carried out in a comminution zone so that a finely divided polymer is thereby produced. The diluent and alcohol are then separated from the polymer, for example by filtration and the polymer is then dried. The diluent and alcohol can be separated, for example by fractional distillation, and reused in the process.

A more comprehensive understanding of the invention may be obtained by referring to the following illustrative example which is not intended, however, to be unduly limitative.

EXAMPLE

Ethylene was polymerized in a 2700 cubic centimeter stainless steel rocking autoclave in the presence of a catalyst consisting of 3 cubic centimeters of triethylaluminum, 1 cubic centimeter of titanium butoxide and 1.35 cubic centimeter (4.2 grams) of bromine. The autoclave was flushed with prepurified nitrogen prior to and during the charging procedure to prevent contact of the catalyst with air or moisture. Five hundred cubic centimeters of cyclohexane, which served as a diluent, the triethylaluminum, and the bromine were added to the reactor and allowed to stand for one-half hour. Then the titanium butoxide was added, the autoclave was closed and was pressured with ethylene to about 300 p.s.i.g. at 80° F. The ethylene feed was passed through a purification system to remove oxygen, carbon dioxide and water vapor prior to entering the reactor. The purification system comprised a pyrogallol solution, a sodium hydroxide solution and a drying agent.

The pressure dropped gradually and at the end of 2½ hours it had dropped approximately 85 pounds per square inch. Heating of the reactor was initiated at this point, and the temperature increased gradually until it reached 200° F., at which time the pressure was about 290 p.s.i.g. At this point the reactor was repressured to about 500 p.s.i.g. with ethylene. During the next 2 hours, the temperature was maintained at about 200° F. by an automatic control instrument. At the end of this period, the pressure was 400 p.s.i.g. The autoclave was repressured to about 500 p.s.i.g., and the temperature was maintained at about 200° F. for an additional 4 hours. At the end of this period, the pressure had dropped to about 420 p.s.i.g. The reactor was then heated to about 280° F., at which time the pressure was 610 p.s.i.g. During the next 8 hours the temperature was maintained at about 280° F. by an automatic control instrument, and at the end of this time it was found that the pressure had dropped to about 560 p.s.i.g. At the end of this time, heating was terminated and the reactor was allowed to cool in the atmosphere until it reached room temperature. Ethylene was vented and the polymer was removed from the reactor. The product had absorbed the cyclohexane and was a mottled yellow and brown, tough, solid material. The polymer was placed in methanol and ground in a Waring Blendor. The finely divided material was separated from the liquid and was dried for about 18 hours in an oven maintained at approximately 80° C. and a vacuum of about 28 inches of mercury. Approximately 102 grams of a light brown ethylene polymer was recovered.

The ethylene used was obtained from the Matheson Company, Inc., of Joliet, Illinois, and had a purity of 99.5 weight percent. The titanium butoxide was a colorless liquid with a melting point below −40° C., which was obtained from E. I. du Pont de Nemours and Company, Wilmington, Delaware. The cyclohexane was a commercial grade containing approximately 85 mol percent cyclohexane which had been thoroughly dried prior to use.

The triethylaluminum was prepared according to the following general procedure. First, ethyl chloride was reacted with metallic aluminum at approximately 248 to 302° F. to form a mixture of ethylaluminum dichloride and diethylaluminum chloride. This mixture was distilled and the distillate was found to contain 52.7 weight percent chlorine. The mixture was treated in a second step with magnesium and ethyl chloride at about 230 to 248° F. for 6 hours, and for an additional 3-hour period at about 356° F. Thus a major portion of the ethylaluminum dichloride present in the reaction mixture from the first step was converted to diethylaluminum chloride. The reaction mixture from this second step was distilled and the distillate was found to contain 33 weight percent chlorine. (The theoretical for diethylaluminum chloride is 29.4 percent chlorine.) The distillate from the second step was treated with sodium in cetane for 45 minutes at 248° F. and for an additional 4 hours at 320–356° F. The product was distilled and was found to be substantially pure triethylaluminum. Analysis indicated that it contained 0.51 percent chlorine.

The properties of a sample of the ethylene polymer are presented below in the table.

*Table*

| | |
|---|---|
| Density, grams per cc. at room temperature | 0.935. |
| Melting point, ° F. | 243±5. |
| Inherent viscosity [1] | 5.173. |
| Molecular weight (based on inherent viscosity) | 126,480. |
| Ash, percent | 0.058. |
| Flexibility | Good. |
| Moldability | Fair. |
| Color (after molding) | Mottled brown. |

[1] The inherent viscosity was obtained at 130° C., using a solution 0.2 gram of polymer per 100 milliliters of tetralin.

The polymers produced in accordance with the invention have utility in applications where solid plastics are used. They can be used to impregnate paper and fabrics, and they can be molded to form articles of any desired shape, such as bottles and other containers for liquids. Also, they can be formed into pipe by extrusion.

As will be evident to those skilled in the art, many variations and modifications can be practiced within the scope of the disclosure and claims of this invention. The invention resides in an improved polymerization process for olefins as described herein comprising the use of a novel catalyst composition and the polymers so produced, said catalyst composition comprising (A) at least one group IV–A metal derivative selected from the group consisting of (1) salts of monobasic organic acids and a group IV–A metal, (2) complex salts of dibasic organic acids and at least one group IV–A metal and at least one member selected from the group consisting of alkali metals and ammonia, (3) compounds corresponding to the formula $X_nM(OR)_m$, (4) compounds corresponding to the formula $$M_a[(OCH_2CH_2)_aNH_{(3-a)}]_b$$

and (5) acetylacetonates of a group IV–A metal, wherein X is a halogen, wherein M is a metal selected from the group consisting of titanium, zirconium, hafnium and thorium, wherein R is selected from the group consisting of R'' and R''', where R'' is selected from the group consisting of saturated acyclic (alkyl), monoolefinic acyclic (alkenyl), saturated cyclic (cycloalkyl), monoolefinic cyclic (cycloalkenyl), aromatic (aryl) and combinations of these radicals, and where R''' is selected from the group consisting of (a) R'' radicals which are halogen substituted, (b) R'' radicals which contain oxygen and (c) R'' radicals which are halogen substituted and contain oxygen, said oxygen being present in the form of an ether linkage, wherein R contains not more than 20 carbon atoms and the compound contains not more than 50 carbon atoms, wherein $m$ and $n$ are whole numbers, with $m$ being at least 1 and not greater than the valence of M and with the sum of $m$ and $n$ being equal to the valence of M, and wherein $a$ is an integer from 1 to 3, inclusive, and $b$ is equal to the valence of M, (B) at least one compound of a metal selected from groups II to VIII, inclusive, having the valence linkages thereof individually bound to members selected from the group consisting of hydrogen, saturated acyclic hydrocarbon radicals, saturated cyclic hydrocarbon radicals and aromatic radicals, and alkali metal hydride, alkali metal alkyl and alkali metal aryl complexes of said compound of a metal, and (C) at least one member selected from the group consisting of halogens and hydrogen halides.

I claim:

1. A method for polymerizing an aliphatic 1-olefin having up to and including 8 carbon atoms per molecule which comprises contacting said olefin with a catalyst comprising (A) a group IV–A metal derivative selected from the group consisting of (1) a complex salt of oxalic acid, a metal selected from the group consisting of titanium and zirconium, and an alkali metal, (2) a compound corresponding to the formula $M(OR)_m$, wherein M is a metal selected from the group consisting of titanium and zirconium, R is an alkyl radical containing from 1 to 20 carbon atoms and the compound contains up to a total of 50 carbon atoms, and $m$ is equal to the valence of the metal M, and (3) a compound selected from the group consisting of titanium acetylametonate and zirconium acetylacetonate, (B) a compound corresponding to the formula $M'R'_x$, wherein M' is a metal selected from the group consisting of beryllium, aluminum and gallium, R' is an alkyl radical, and $x$ is equal to the valence of the metal M', and (C) a member selected from the group consisting of halogen and hydrogen halides, said catalyst containing from 0.01 to 5 mols of component (A) per mol of component (B) and from 0.01 to 5 mols of component (C) per mol of component (B).

2. A method in accordance with claim 1 wherein said polymerizable hydrocarbon is ethylene and said catalyst consists essentially of triethylaluminum, titanium butoxide and bromine, said catalyst containing from 0.01 to 5 mols of titanium butoxide per mol of triethylaluminum and from 0.01 to 5 mols of bromine per mol of triethylaluminum.

3. A method in accordance with claim 1 wherein said polymerizable hydrocarbon is ethylene and said catalyst consists essentially of triethylaluminum, titanium acetylacetonate and chlorine, said catalyst containing from 0.01 to 5 mols of titanium acetylacetonate per mol of triethylaluminum and from 0.01 to 5 mols of chlorine per mol of triethylaluminum.

4. A method in accordance with claim 1 wherein said polymerizable hydrocarbon is ethylene and said catalyst consists essentially of triethylgallium, zirconium butoxide and chlorine, said catalyst containing from 0.01 to 5 mols of zirconium butoxide per mol of triethylgallium and from 0.01 to 5 mols of chlorine per mol of triethylgallium.

5. A method in accordance with claim 1 wherein said polymerizable hydrocarbon is ethylene and said catalyst consists essentially of triethylaluminum, titanium butoxide and hydrogen chloride, said catalyst containing from 0.01 to 5 mols of titanium butoxide per mol of triethylaluminum and from 0.01 to 5 mols of hydrogen chloride per mol of triethylaluminum.

6. A method in accordance with claim 1 wherein said polymerizable hydrocarbon is ethylene and said catalyst consists essentially of diethylberyllium, titanium potassium oxalate and hydrogen bromide, said catalyst containing from 0.01 to 5 mols of titanium potassium oxalate per mol of diethylberyllium and from 0.01 to 5 mols of hydrogen bromide per mol of diethylberyllium.

7. A method for polymerizing ethylene which comprises contacting ethylene with a catalyst consisting essentially of triethylaluminum, titanium butoxide and bromine, said catalyst containing from 0.01 to 5 mols of titanium butoxide per mol of triethtylaluminum and from 0.01 to 5 mols of bromine per mol of triethylaluminum, said contacting occurring in the presence of a hydrocarbon diluent, inert and liquid under conditions of the method, at a temperature in the range of 100 to 350° F. and a pressure in the range of 100 to 1000 p.s.i.g.

8. A catalyst composition consisting essentially of a reaction product obtained by mixing triethylaluminum, titanium butoxide and bromine, the ratio of the amount of said titanium butoxide to triethylaluminum being in the range of 0.01 to 5 mols of titanium butoxide per mol of triethylaluminum and the ratio of the amount of bromine to triethylaluminum being in the range of 0.01 to 5 mols of bromine per mol of triethylaluminum.

9. A catalyst composition consisting essentially of a reaction product obtained by mixing triethylaluminum, titanium acetylacetonate and chlorine, the ratio of the amount of titanium acetylacetonate per mol of triethylaluminum being in the range of 0.01 to 5 mols of titanium acetylacetonate per mol of triethylaluminum and the ratio of the amount of chlorine per mol of triethylaluminum being in the range of 0.01 to 5 mols of chlorine per mol of triethylaluminum.

10. A catalyst composition consisting essentially of a reaction product obtained by mixing triethylgallium, zirconium butoxide and chlorine, the ratio of the amount of zirconium butoxide per mol of triethylgallium being in the range of 0.01 to 5 mols of zirconium butoxide per mol of triethylgallium and the ratio of the amount of chlorine to triethylgallium being in the range of 0.01 to 5 mols of chlorine per mol of triethylgallium.

11. A catalyst composition consisting essentially of a reaction product obtained by mixing triethylaluminum, titanium butoxide and hydrogen chloride, the ratio of the amount of titanium butoxide per mol of triethylaluminum being in the range of 0.01 to 5 mols of titanium butoxide per mol of triethylaluminum and the ratio of the amount of hydrogen chloride per mol of triethylaluminum being in the range of 0.01 to 5 mols of hydrogen chloride per mol of triethylaluminum.

12. A catalyst composition consisting essentially of a reaction product obtained by mixing diethylberyllium, titanium potassium oxalate and hydrogen bromide, the ratio of the amount of titanium potassium oxalate per mol of diethylberyllium being in the range of 0.01 to 5 mols of titanium potassium oxalate per mol of diethylberyllium and the ratio of the amount of hydrogen bromide to diethylberyllium being in the range of 0.01 to 5 mols of hydrogen bromide per mol of diethylberyllium.

13. A method for polymerizing an aliphatic 1-olefin having up to and including 8 carbon atoms per molecule which comprises contacting said olefin with a catalyst comprising (A) a group IV–A metal derivative selected from the group consisting of (1) a complex salt of oxalic acid, a metal selected from the group consisting of titanium and zirconium, and an alkali metal, (2) a compound corresponding to the formula $M(OR)_m$, wherein M is a metal selected from the group consisting of titanium and zirconium, R is an alkyl radical containing from 1 to 20 carbon atoms and the compound contains up to a total of 50 carbon atoms, and $m$ is equal to the valence of the metal M, and (3) a compound selected from the group consisting of titanium acetylacetonate and zirconium acetylacetonate, (B) a compound corresponding to the formula $M'R'_x$, wherein M' is a metal selected from the group consisting of beryllium, aluminum and gallium, R' is an alkyl radical, and $x$ is equal to the valence of the metal M', and (C) a member selected from the group consisting of halogen and hydrogen halides, said catalyst containing from 0.01 to 5 mols of component (A) per mol of component (B) and from 0.01 to 5 mols of component (C) per mol of component (B), at a temperature in the range of zero to 500° F., in the presence of a hydrocarbon diluent, inert and liquid under conditions of the method, at a pressure sufficient to maintain said diluent in liquid phase, and recovering the solid polymer so produced.

14. A catalyst composition comprising a reaction product obtained by mixing (A) a group IV–A metal derivative selected from the group consisting of (1) a complex salt of oxalic acid, a metal selected from the group consisting of titanium and zirconium, and an alkali metal, (2) a compound corresponding to the formula $M(OR)_m$, wherein M is a metal selected from the group consisting of titanium and zirconium, R is an alkyl radical containing from 1 to 20 carbon atoms and the compound contains up to a total of 50 carbon atoms, and $m$ is equal to the valence of the metal M, and (3) a compound selected from the group consisting of titanium acetylacetonate and zirconium acetylacetonate, (B) a compound corresponding to the formula $M'R'_x$, wherein M' is a metal selected from the group consisting of beryllium, aluminum and gallium, R' is an alkyl radical, and $x$ is equal to the valence of the metal M', and (C) a member selected from the group consisting of halogen and hydrogen halides, the ratio of the amount of component (A) to component (B) being in the range of 0.01 to 5 mols of component (A) per mol of component (B) and the ratio of the amount of component (C) to component (B) being in the range of 0.01 to 5 mols of component (C) per mol of component (B).

References Cited in the file of this patent

UNITED STATES PATENTS

| | | |
|---|---|---|
| 2,388,178 | Peterson | Oct. 30, 1945 |
| 2,396,920 | Larson | Mar. 19, 1946 |
| 2,439,765 | Walker | Apr. 13, 1948 |
| 2,600,654 | Jacobson | June 17, 1952 |
| 2,833,755 | Coover | May 6, 1958 |
| 2,846,427 | Findlay | Aug. 5, 1958 |

FOREIGN PATENTS

| | | |
|---|---|---|
| 534,792 | Belgium | Jan. 31, 1955 |